(12) United States Patent
Hutterer

(10) Patent No.: US 9,069,630 B2
(45) Date of Patent: Jun. 30, 2015

(54) LABELING OF INPUT DEVICE COMPONENTS

(75) Inventor: Peter Hutterer, Greenslopes (AU)

(73) Assignee: Red Hat, Inc., Raleigh, NC (US)

( * ) Notice: Subject to any disclaimer, the term of this patent is extended or adjusted under 35 U.S.C. 154(b) by 1418 days.

(21) Appl. No.: 12/611,045

(22) Filed: Nov. 2, 2009

(65) Prior Publication Data

US 2011/0107356 A1    May 5, 2011

(51) Int. Cl.
G06F 3/00 (2006.01)
G06F 9/44 (2006.01)
G06F 9/46 (2006.01)
G06F 13/00 (2006.01)
G06F 9/54 (2006.01)

(52) U.S. Cl.
CPC ..................................... *G06F 9/545* (2013.01)

(58) Field of Classification Search
CPC ....................................................... G06F 9/545
USPC ........................................................ 719/328
See application file for complete search history.

(56) References Cited

U.S. PATENT DOCUMENTS 5,600,778 A * 2/1997 Swanson et al. ............... 715/762
6,014,511 A * 1/2000 Krithivas et al. ................ 703/26

OTHER PUBLICATIONS

Dragicevic et al, "Input Device Selection and Interaction Configuration with ICON", 2001, pp. 1-8.*
Dragicevic et al, "Support for Input Adaptability in the ICON Toolkit", 2004, ACM, pp. 1-8.*
Wintab Interface Specification 1.4:, Wacom Technology Corp., original copyright 1991 by LSC/Telegrahics (updated copyright 2014) accessible at URL http://www.wacomeng.com/windows/docs/Wintab_v140.htm.
Wintab Backgrounder, Wacom Technology Corp., original copyright 2010 by LSC/Telegraphics (updated copyright 2010) accessible at URL http://www.wacomeng.com/windows/docs/Wintab-Background.htm.
Carbon Event Manager, Apple Inc. 1999-2006, accessible at URL http://webnnel.googlecode.com/svn/trunk/lib/Carbon. framework/Versions/A/Frameworks/HIToolbox.framework/Versions/A/Headers/CarbonEvents.h.

* cited by examiner

*Primary Examiner* — Timothy A Mudrick
(74) *Attorney, Agent, or Firm* — Lowenstein Sandler LLP

(57) ABSTRACT

The automated labeling system provides access to the input mechanism axes and button semantic information to applications running in a windowing environment. This enables the applications to not have to have specific information or interface with the low level drivers of the input mechanism and can rely exclusively on the windowing system and its API to interface with the input devices attached to the computer system.

18 Claims, 3 Drawing Sheets

LABELING OF INPUT DEVICE COMPONENTS

TECHNICAL FIELD

Embodiments of the invention relate to a system for automatically labeling the axes and buttons of an input device. Specifically, embodiments of the invention relate to a graphical driver for automatically labeling the axes and buttons of an input device within the windowing environment.

BACKGROUND

Applications in the X Window System do not have access to information about the buttons and axes of available input devices. As a result, these applications must be manually configured or rely on assumptions of the configuration of the input mechanisms of input devices to provide access to the functionality of the connected input device. For example, an application may know that a connected mouse has three input buttons. The application may assume based on convention that the three buttons are a right button, a middle button and a left button. However, the type and function of each button is not known. If the mouse has a non-conventional configuration of buttons, then the functionality of these buttons cannot be known or correctly mapped onto the functionality of the application. Relying solely on conventions is not a reliable manner in which to interface with a connected device. To gain access to reliable information, the application would have to directly access the low level drivers or the input mechanism data stored in the operating system kernel. Nevertheless, applications are not typically granted access to these types of operating system resources and it is not practical for an application to be able to access all types of low level drivers due to the large and constantly changing number of such drivers. For an application to access a low level driver, the application requires specific information about the composition and function of these drivers. If a device driver is not known to the application, then the application is unable to access the information.

BRIEF DESCRIPTION OF THE DRAWINGS

Embodiments of the present invention are illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
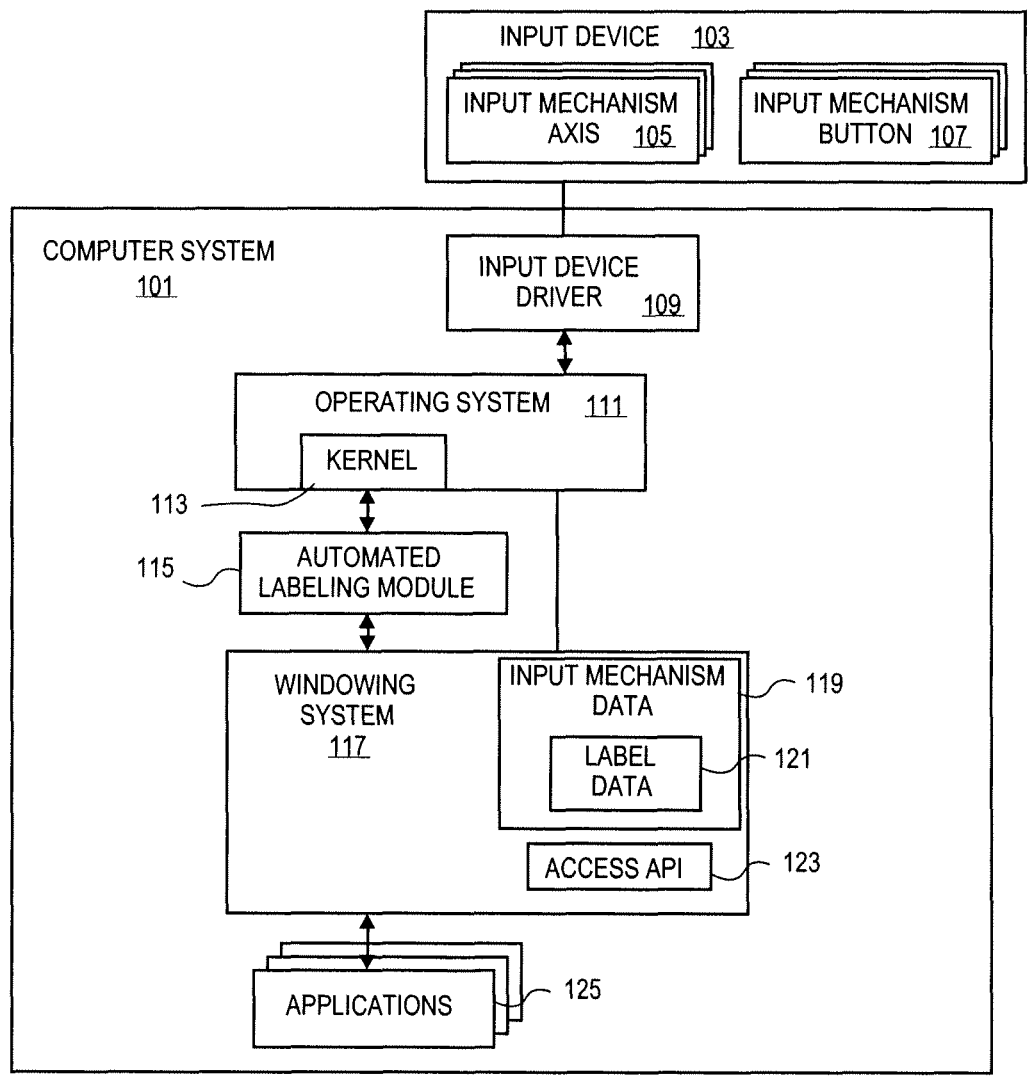
FIG. 1 is a diagram of one embodiment of a system implementing automatic input device labeling.

FIG. 1 is a diagram of one embodiment of a system implementing automatic input device labeling. The system includes a computer system 101 with any number of connected input devices 103. The computer system 101 can be any type of computer system including a desktop computer, workstation, laptop computer, handheld computer, tablet computer or similar computing device. Computer system 101 can be connected to the input devices 103 through any communication protocol or port type. For example, the computer system 101 can be connected to the input devices 103 through a universal serial bus (USB), serial port, parallel port, Firewire port, wireless protocol, network connection or similar port or protocol.

The input devices 103 can include any type or number of input devices having any number of axes and buttons or similar input mechanisms. The input devices 103 can include joysticks, gamepads, drawing tablets, scanners, mice, keyboards or similar input devices. The input mechanism axes 105 can be tied to any type of directional input mechanism including track balls, mouse balls, optical movement sensors (e.g., sensors used in an optical mouse), mini-stick, directional pad, stylus or similar directional input mechanisms. Input devices 103 can also include any number or type of button mechanisms 107. An input device can have multiple buttons each of which are either analog or digital. In some cases, the buttons can be considered as an input mechanism having an axis where a range of button depression is detectable.

The computer system 101 includes an operating system 111, windowing system 117, set of applications 125, automated labeling module 115 and a set of input device drivers 109. A 'set,' as referred to herein, refers to any positive whole number of items including one item.

The input device drivers 109 are a set of low level drivers that directly interface with the input device 103 and interpret the signals or data from the input device 103. Each input device driver 109 is specific to the individual input device 103, that is, each input device 103 uses a separate input device driver 109. The input device driver 109 transfers configuration data received from the input device 103 to the operating system 111 to provide the operating system 111 with the configuration information. In one embodiment, the configuration information or device information received from the input device includes human interface device (HID) data or more specifically USB-HID data. The configuration information is utilized by the operating system 111 to determine how input received from the input device 103 is managed or processed. The operating system 111 and input device drivers 109 typically interact through an interrupt system or similar event handling system.

The operating system 111 can be any operating system including the Linux operating system or more specifically Fedora® by Red Hat of Raleigh, N.C., the Windows® operating system by Microsoft Corporation of Redmond, Wash., OS X® by Apple, Inc. of Cupertino, Calif. or similar operating system. The operating system 111 can include a kernel 113 such as the Linux kernel, which is the core operating system code that manages the execution of processes and threads on a processor and similar resources of the system. The operating system 111 can also include a data structure to store input device configuration data and related data. The input device configuration data can include input mechanism axes and button information and descriptive information about each axis and each button of an input device. This descriptive material is referred to herein as a label. This axis and button label information is retrieved or received by the operating system 111 from the input device driver 109. In one embodiment, the input device driver 109 receive HID or similar data from the input device 103 that identifies input device 103 and provides configuration information about the input device 103. This HID data or similar configuration data can be provided to and stored by the operating system 111. The HID data or configuration data is accessible through a configuration application programming interface (API) such as an event interface or similar interface of the operating system 111 or kernel 113. The configuration API is a set of functions and related data structures that allow access to and modification of the configuration data maintained by the operating system.

The automated labeling module 115 serves as a generic driver for all input devices 103 for the windowing system 117 and the applications 125 executing in the windowed environment by providing the configuration information necessary to use all input devices 103. In one embodiment, the automated labeling module 115 accesses this input mechanism configuration data through the configuration API or similar interface of the operating system 111 or kernel 113 and copies this information to the windowing system 117. The windowing system stores this information as a set of input mechanism data 119 including the labels for the individual input mechanisms 121. The automatic labeling module 115 can execute during the initialization of the windowing system 117 or can continuously operate during the operation of the windowing system 117 to transfer the input device configuration data from the operating system 111 or kernel 113 into the input mechanism data structure 119 as it becomes available or as is updated. Transferring the input device configuration data from the operating system 111 to the windowing system 117 makes it available to the applications 125 that are executing in the windowing environment. Otherwise, the applications 125 would not have access to this information.

The automated labeling module 115 can initiate the transfer of the configuration data including labeling data from the operating system 111 or kernel 113 to the windowing system 117 by calling functions of the configuration API to retrieve the individual data configuration entries stored therein. The automated labeling module 115 retrieves axes and button parameter data. This can be an iterative process where the automated labeling module 115 requests the parameters for the axes and buttons including absolute and relative input mechanism data. The label data for each of the axes and buttons is also retrieved. The label data is semantic data describing each of the axes and buttons. The label data can be any code or indicator having a known or defined semantic value. For example, the label can be a code indicating that an axis is an x-axis, y-axis, or z-axis of a joystick or mouse ball, a mouse wheel, a stylus tip pressure indicator, or similar input mechanism. This data is then transferred to the windowing system by an interface such as an API where function calls are made to update the input mechanism data structure 119 to include the configuration data including the labels.

The windowing system 117 can be any type of windowing system including the X Window System. The windowing system 117 provides a set of user interface functions and data structures that provide a windows based environment for applications to be accessed and utilized by a user of the computer system 101. The input mechanism data structure 119 is created and maintained by the windowing system 117. The input mechanism data structure 119 can be accessed by applications running in the windowing environment through a specific or general purpose access API 123. This access API 123 provides the applications with a set of functions for accessing the information in the input mechanism data structure 119 including the label data 121. This label data 121 is the semantic information regarding the individual axes and buttons for each input device. The functions of the access API 123 that provide the labels enable the applications to determine the type or function of each axes and button of each available input device such that any application 125 can make use of all axes and buttons of each input device connected to the computer system. The label data 121 enables the applications 125 to properly interpret the parameter data for each axis and button stored in the input mechanism data structure 119. For example, the parameter data can include a range of input values for an axis of an input device that cannot be reliably utilized without the label information indicating that the axis is a y-axis.

The applications 125 can be any type of applications including business applications, productivity applications, gaming applications or similar applications that run in a windowed environment. These applications 125 can utilize any type of input device 103 and can access the configuration information for the input mechanisms or the input device 103 through the access API 123 of the windowing system 117. This access API 123 can be generic to any input mechanism and input device 103 to provide access to the input mechanism data structure 119 and labeling data 121 stored by the windowing system 117.

Figure 2:
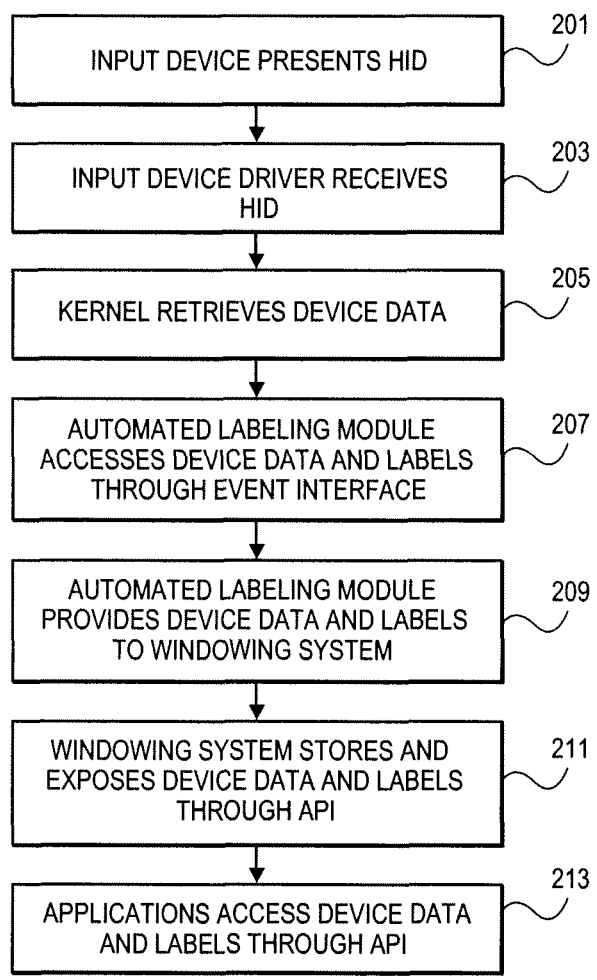
FIG. 2 is a flowchart of one embodiment of a method for automatic input device labeling.

FIG. 2 is a flowchart of one embodiment of an automatic labeling method. In one embodiment, the process is initiated or starts in response to the detection or connection of an input device. The input device might be connected by a USB port, serial port, parallel port or similar computer port. When the input device is connected, the input device presents its HID data or similar identification or configuration data such that the corresponding driver can be identified to service the input for the input device (Block 201). The input device driver receives the HID from the input device (Block 203). The input device driver can configure the input device, service input from the input device and similarly interact with the input device.

The input device driver can provide the HID or similar identification and configuration information regarding the input device as well as the input mechanisms including the axes and input buttons to the kernel or operating system (Block 205). The automatic labeling module accesses this input device configuration and identification data through a configuration API or similar interface of the operating system or kernel (Block 207). This can occur during the initialization of the operating system, windowing system, in response to the detection of any new input device, in response to an update of the device data at the operating system or any combination of these events.

The automated labeling module transfers this information to a data structure of the windowing system (Block 209). The automated labeling module can call an API of the windowing system or similar interface of the windowing system to provide the data obtained from the operating system including the label information for a specific input device or any number of input devices. This data is then used to populate an input mechanism data structure in the windowing system. The windowing system then exposes this information through an access API to the applications running in the windowing environment (Block 211). In other embodiments, the windowing system can store this information in any sort of data structure or combination of data structures. The applications that need to utilize the input devices can access specific configuration information about that input device by use of the access API (Block 213). The information available to the applications includes input mechanism parameters for each axis and button and labels for each input mechanism.

Figure 3:
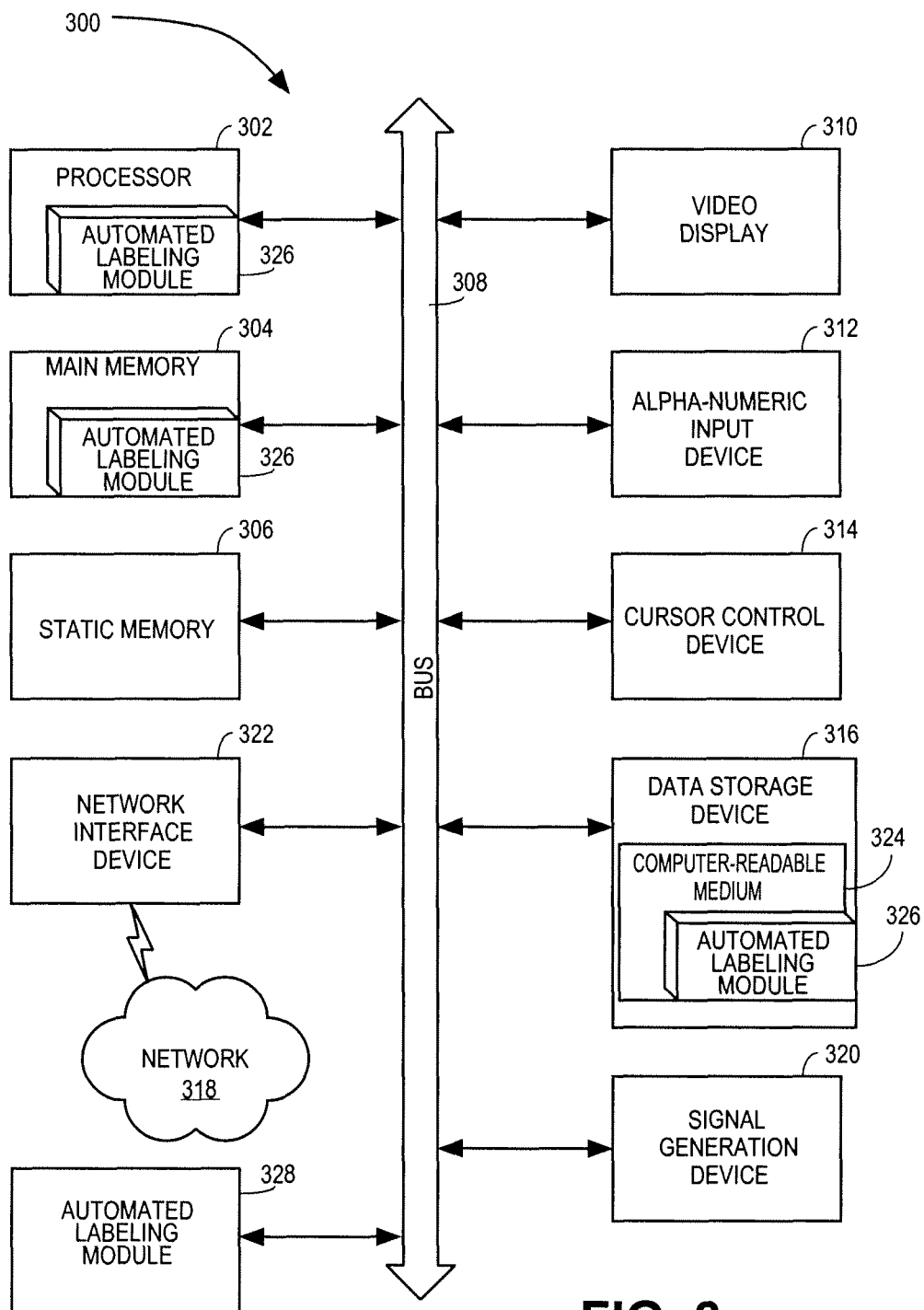
FIG. 3 is a diagram of one embodiment of a computer system implementing the automated input device labeling.

FIG. 3 is a diagram of one embodiment of a computer system implementing the automated input device labeling. Within the computer system 300 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine (e.g., a client computer executing the automated labeling module) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 300 includes a processing device 302, a main memory 304 (e.g., read-only memory (ROM), flash memory, or dynamic random access memory (DRAM) such as synchronous DRAM (SDRAM), etc.), a static memory 306 (e.g., flash memory, static random access memory (SRAM), etc.), and a secondary memory 316 (e.g., a data storage device in the form of a drive unit, which may include fixed or removable computer-readable medium), which communicate with each other via a bus 308.

Processing device 302 represents one or more general-purpose processing devices such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute the automated labeling module 324 for performing the operations and steps discussed herein.

The computer system 300 may further include a network interface device 322. The computer system 300 also may include a video display unit 310 (e.g., a liquid crystal display (LCD) or a cathode ray tube (CRT)) connected to the computer system through a graphics port and graphics chipset, an alphanumeric input device 312 (e.g., a keyboard), a cursor control device 314 (e.g., a mouse), and a signal generation device 320 (e.g., a speaker).

The secondary memory 316 may include a machine-readable storage medium (or more specifically a computer-readable storage medium) 324 on which is stored one or more sets of instructions (e.g., the automated labeling module 326) embodying any one or more of the methodologies or functions described herein. The automated labeling module 326 may also reside, completely or at least partially, within the main memory 304 and/or within the processing device 302 during execution thereof by the computer system 300, the main memory 304 and the processing device 302 also constituting machine-readable storage media. The automated labeling module 326 may further be transmitted or received over a network 318 via the network interface device 322.

The machine-readable storage medium 324 may also be used to store the automated labeling module 326 persistently. While the machine-readable storage medium 324 is shown in an exemplary embodiment to be a single medium, the term "machine-readable storage medium" and also "computer-readable storage medium" should be taken to include a single medium or multiple media (e.g., a centralized or distributed database, and/or associated caches and servers) that store the one or more sets of instructions. The terms "machine-readable storage medium" and "computer-readable storage medium" shall also be taken to include any medium that is capable of storing or encoding a set of instructions for execution by the machine and that cause the machine to perform any one or more of the methodologies of the present invention. The terms "machine-readable storage medium" and "computer-readable storage medium" shall accordingly be taken to include, but not be limited to, solid-state memories, and optical and magnetic media.

The automated labeling module 326 can also be a discrete component 328 that performs the functions described herein. The automated labeling component 328 can be any type of special purpose or programmed device in communication with the computer system over the bus or through a network connection.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "managing," "providing," "storing," "obtaining," "responding," "accessing," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms presented herein are not inherently related to any particular computer or other apparatus. Various general purpose systems may be used with programs in accordance with the teachings herein or it may prove convenient to construct more specialized apparatus to perform the required method steps. The required structure for a variety of these systems appears in the description above. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for an automated labeling module has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   obtaining label data for an input device from an interface of an operating system to access the label data from a device driver corresponding to the input device by an automated labeling module executed by a processing device, the label data providing semantic information for the input device; and
   providing the label data directly to a windowing system by the automated labeling module, the windowing system to provide the label data to an application in response to an update of the label data by the operating system.

2. The method of claim 1, wherein obtaining label data comprises:
   accessing the operating system interface for each input device axis and each input device button.

3. The method of claim 1, wherein the label data includes a pre-defined value identifying a function of an axis or button of an input device.

4. The method of claim 1, further comprising:
   storing the label data by the windowing system in an input device data structure.

5. The method of claim 1, further comprising:
   receiving a request for the label data through an application programming interface of the windowing system.

6. The method of claim 5, further comprising:
   responding to the request by returning a value with a known semantic identifying an input device function.

7. The method of claim 6, wherein the input device function is any one of an input device axis or an input device button.

8. The method of claim 1, wherein the operating system interface is a configuration application programming interface (API).

9. A non-transitory computer-readable storage medium, having instructions stored therein, which when executed cause a computer to perform a set of operations comprising:
   obtaining label data for an input device from an interface of an operating system to access the label data from a device driver corresponding to the input device by an automated labeling module executed by a processing device, the label data providing semantic information for the input device; and
   providing the label data directly to a windowing system by the automated labeling module, the windowing system to provide the label data to an application in response to an update of the label data by the operating system.

10. The non-transitory computer-readable storage medium of claim 9, wherein obtaining label data comprises:
    accessing the operating system interface for each input device axis and each input device button.

11. The non-transitory computer-readable storage medium of claim 9, wherein the label data includes a pre-defined value identifying a function of an axis or button of an input device.

12. The non-transitory computer-readable storage medium of claim 9, having further instructions stored therein, which when executed cause the computer to perform a set of operations further comprising:
    storing the label data by the windowing system in an input device data structure.

13. The non-transitory computer-readable storage medium of claim 9, having further instructions stored therein, which when executed cause the computer to perform a set of operations further comprising:
    receiving a request for the label data through an application programming interface of the windowing system.

14. The non-transitory computer-readable storage medium of claim 13, having further instructions stored therein, which when executed cause the computer to perform a set of operations further comprising:
    responding to the request by returning a value with a known semantic identifying an input device function.

15. The non-transitory computer-readable storage medium of claim 14, wherein the input device function is any one of an input device axis or an input device button.

16. The non-transitory computer-readable storage medium of claim 9, wherein the operating system interface is a configuration application programming interface (API).

17. A computer system comprising:
    a memory; and
    a processing device, coupled to the memory, the processing device to:
        obtain label data for an input device from an interface of an operating system to access the label data from a device driver corresponding to the input device by an automated labeling module executed by the processing device, the label data providing semantic information for the input device; and
        provide the label data directly to a windowing system by the automated labeling module, the windowing system to provide the label data to an application in response to an update of the label data by the operating system.

18. The system of claim 17, wherein the processing device is further to access the label data from a configuration application programming interface (API) of the operating system.

* * * * *